(12) United States Patent
Phillips et al.

(10) Patent No.: US 9,575,470 B2
(45) Date of Patent: Feb. 21, 2017

(54) SYSTEM FOR BIOMETRIC IDENTITY CONFIRMATION

(71) Applicant: Integrated Monitoring Systems, LLC, Lakewood, CO (US)

(72) Inventors: Brian K. Phillips, Lakewood, CO (US); Geoffrey A. Wilson, Roseburg, OR (US)

(73) Assignee: Integrated Monitoring Systems, LLC, Lakewood, CO (US)

( * ) Notice: Subject to any disclaimer, the term of this patent is extended or adjusted under 35 U.S.C. 154(b) by 0 days.

(21) Appl. No.: 15/051,935

(22) Filed: Feb. 24, 2016

(65) Prior Publication Data

US 2016/0170383 A1    Jun. 16, 2016

Related U.S. Application Data

(63) Continuation-in-part of application No. 13/739,224, filed on Jan. 11, 2013, now Pat. No. 9,274,509.

(60) Provisional application No. 61/589,084, filed on Jan. 20, 2012.

(51) Int. Cl.
*G05B 1/01* (2006.01)
*G06F 21/32* (2013.01)
*G06K 9/00* (2006.01)

(52) U.S. Cl.
CPC ............... *G05B 1/01* (2013.01); *G06F 21/32* (2013.01); *G06K 9/00906* (2013.01); *G06F 2221/2117* (2013.01)

(58) Field of Classification Search
CPC ...... G06F 21/32; G06F 21/34; G06F 19/3418; G06F 21/35; G06F 21/31; G06F 21/445; G06F 21/6245; G06F 19/322; G06F 19/3406

USPC ............................................ 340/5.82
See application file for complete search history.

(56) References Cited

U.S. PATENT DOCUMENTS

| | | |
|---|---|---|
| 3,238,783 A | 3/1966 | Wright |
| 3,799,149 A | 3/1974 | Rummel et al. |
| 4,346,584 A | 8/1982 | Boehringer |
| 4,487,055 A | 12/1984 | Wolf |
| 4,678,057 A | 7/1987 | Elfman et al. |
| 4,736,619 A | 4/1988 | Legrand |
| 4,809,810 A | 3/1989 | Elfman et al. |
| 5,220,919 A | 6/1993 | Phillips et al. |
| 5,719,950 A | 2/1998 | Osten et al. |
| 5,739,412 A | 4/1998 | Stock et al. |
| 5,904,669 A | 5/1999 | Schildgen et al. |

(Continued)

FOREIGN PATENT DOCUMENTS

| | | |
|---|---|---|
| EP | 0153741 A2 | 9/1985 |
| WO | 94/07407 | 4/1994 |

*Primary Examiner* — Mark Blouin
(74) *Attorney, Agent, or Firm* — Dorr, Carson & Birney PC

(57) ABSTRACT

A biometric identity confirmation system is based on both pulse wave shape data and spirometric data for the subject. During an initial enrollment mode, pulse wave shape and spirometric data for a known subject are used to generate subject characterization data for the known subject by computing an exemplar and selectively weighting portions of the exemplar based, for example, on repeatability or distinguishing characteristic features over the population of known subjects. During a subsequent identity authentication mode, pulse wave shape and spirometric data for a test subject are analyzed using the subject characterization data to confirm whether the identity of the test subject matches the known subject.

12 Claims, 7 Drawing Sheets

*Enrollment Mode*

(56) References Cited

U.S. PATENT DOCUMENTS

| | | |
|---|---|---|
| 6,379,311 B1 | 4/2002 | Gaumond et al. |
| 6,483,929 B1 | 11/2002 | Murakami et al. |
| 6,923,040 B2 | 8/2005 | Stock |
| 6,967,581 B2 | 11/2005 | Karsten |
| 6,985,070 B1 * | 1/2006 | Parker .................... G06Q 10/02 340/5.33 |
| 6,993,378 B2 * | 1/2006 | Wiederhold ....... A61B 5/02055 382/115 |
| 7,002,477 B1 | 2/2006 | Camhi |
| 7,329,390 B2 | 2/2008 | Stock et al. |
| 7,388,493 B2 | 6/2008 | Lerch et al. |
| 7,441,123 B2 * | 10/2008 | Grant ..................... G06F 21/32 382/115 |
| 7,536,557 B2 * | 5/2009 | Murakami ............... G06K 9/00 382/115 |
| 7,541,192 B2 | 6/2009 | Stock |
| 7,554,666 B2 | 6/2009 | Russell |
| 7,603,887 B2 * | 10/2009 | Schlichte ........... G01N 33/4972 600/532 |
| 7,609,145 B2 | 10/2009 | Martis et al. |
| 7,611,461 B2 | 11/2009 | Hawthorne et al. |
| 7,616,123 B2 | 11/2009 | Ridder et al. |
| 7,641,611 B2 | 1/2010 | Hawthorne et al. |
| 7,724,925 B2 | 5/2010 | Shepard |
| 7,756,558 B2 | 7/2010 | Ridder et al. |
| 7,796,013 B2 * | 9/2010 | Murakami .............. G06F 21/32 340/5.52 |
| 2004/0236199 A1 | 11/2004 | Hawthorne et al. |
| 2004/0239510 A1 | 12/2004 | Karsten |
| 2005/0081639 A1 | 4/2005 | Gourley |
| 2006/0074300 A1 | 4/2006 | Green |
| 2007/0177770 A1 | 8/2007 | Derchak et al. |
| 2009/0240161 A1 | 9/2009 | Sutton et al. |
| 2009/0275852 A1 | 11/2009 | Oki et al. |
| 2009/0278659 A1 | 11/2009 | Barzaga Castellanos et al. |
| 2010/0108425 A1 | 5/2010 | Crespo et al. |
| 2011/0009762 A1 | 1/2011 | Eichler et al. |
| 2011/0066041 A1 | 3/2011 | Pandia et al. |
| 2011/0090048 A1 | 4/2011 | Li et al. |

* cited by examiner

*Enrollment Mode*

*Authenticate Identity Mode*

SYSTEM FOR BIOMETRIC IDENTITY CONFIRMATION

RELATED APPLICATION

The present application is a continuation-in-part of the Applicant's U.S. patent application Ser. No. 13/739,224, entitled "System For Biometric Identity Confirmation," filed on Jan. 11, 2013, which is based on and claims priority to U.S. Provisional Patent Application 61/589,084, filed on Jan. 20, 2012.

BACKGROUND OF THE INVENTION

Field of the Invention

The present invention relates generally to the field of biometric identity confirmation. More specifically, the present invention discloses a system for biometric identity confirmation based on analysis of both spirometric data and pulse wave data for a test subject.

Background of the Invention

Biometric identification is the process of recognizing or rejecting an unknown person as a particular member of a previously characterized set, based on biological measurements. The ideal biometric characterization is specific to the individual, difficult to counterfeit, robust to metabolic fluctuations, insensitive to external conditions, easily measured, and quickly processed.

Fingerprint, retinal, iris, and facial scans are well-known biometric identification techniques relying on image processing. Images are two-dimensional, requiring sophisticated and computationally intensive algorithms, the analysis of which is often complicated by random orientation and variable scaling. Voice recognition is an example of biometric identification amenable to time series analysis, an inherently simpler one-dimensional process.

The simplest biometric identifiers can be expressed as a single parameter, such as height or weight. Single parameter identifiers have been the only quantitative means of identification throughout most of history. The price of simplicity is the loss of specificity, and in the case of weight, the lack of constancy over time. Nevertheless, single-parameter biometrics remain effective identifying factors, as is obvious from their continued use.

Identity tracking/confirmation is the process of following the whereabouts of a known subject moving unpredictably among similar individuals, perhaps with deceptive intent. Tracking/confirmation is somewhat simpler than identification, because it merely requires distinguishing the subject from all others rather than distinguishing every individual from every other, and because continuous rather than episodic data are available. Biometric identity tracking/confirmation is the continuous verification that a body-mounted sensor has remained on the subject, and has not been surreptitiously transferred to an impostor. For the purposes of this application, the term "biometric identification" should be broadly construed to encompass both biometric identification in its narrower sense, as described above, and identity tracking/confirmation.

SUMMARY OF THE INVENTION

This invention provides a system for biometric identity confirmation based on both pulse wave shape data and spirometric data for the test subject. During an initial enrollment mode, pulse wave shape and spirometric data for a known subject are used to generate subject characterization data for the known subject by computing an exemplar and selectively weighting portions of the exemplar based, for example, on repeatability or distinguishing characteristic features among known subjects. During a subsequent identity authentication mode, pulse wave shape and spirometric data for a test subject are analyzed using the subject characterization data to confirm whether the identity of the test subject matches the known subject.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

The present invention provides a biometric system for characterizing individuals by the non-invasive sensing of arterial pulse waves and spirometric data for the purposes of identification and identity tracking/confirmation. The major components include a computer processor, data storage, a pulse sensor adjacent to the subject's tissue that generates time-series data based on the subject's pulse waves, and a spirometric sensor that measures predetermined spirometric properties of the exhaled breath sample, such as flow or pressure. This spirometric data is typically generated as time-series data over the course of the sample.

As an overview, the processor initially receives and analyzes the pulse wave data from the pulse sensor and the spirometric data from the spirometric sensor for a known subject to generate subject characterization data identifying the known subject. Thereafter, in the identity authentication mode, the processor simultaneously receives data from the pulse sensor and spirometric sensor for a test subject (who may or may not be the known subject). The processor analyzes this data in conjunction with the stored subject characterization data to determine whether the test subject is the same as the known subject. For the purposes of this application, it should be understood that the phrase "test subject" refers to the person whose identity is being tested or confirmed during the identity authentication mode of the present system.

Thus, the present system operates in one of two mutually exclusive modes—an enrollment mode and an identity authentication mode. The enrollment mode acquires subject data under the supervision of a trained technician, computes subject characteristics, calculates the probability of an impostor producing similar characteristics, and stores these findings in a client database for later use during the identity authentication mode.

Figure 1:
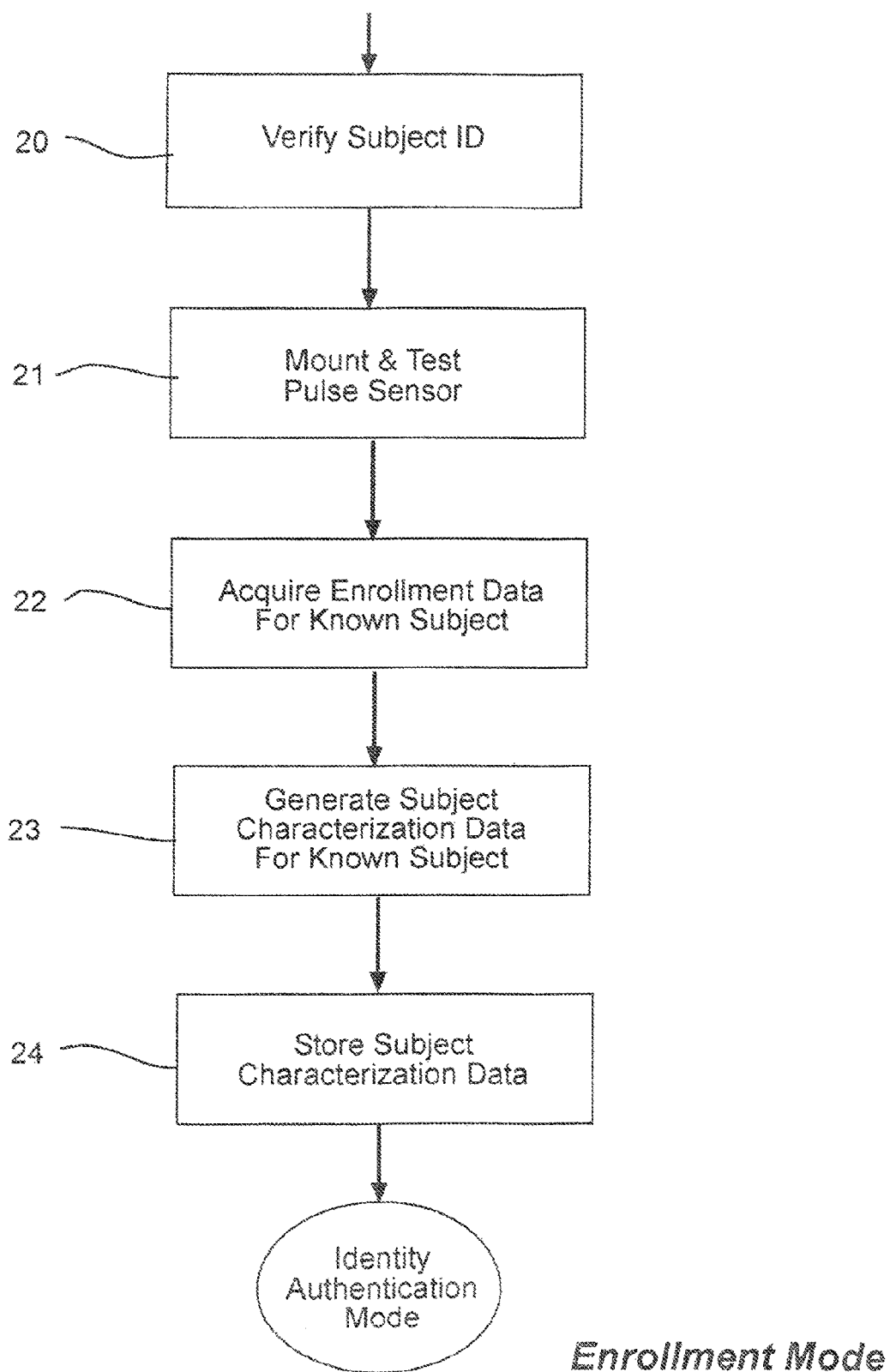
FIG. 1 is a flowchart of the enrollment mode of the present invention.

FIG. 1 is a general flowchart of the enrollment mode employed to initially build subject characterization data for a known subject. The operator first verifies the identity of the subject (step 20), and mounts and tests the pulse sensor on the subject, and provides the subject with a spirometric sensor (step 21). The processor simultaneously acquires pulse wave data from the pulse sensor and spirometric data from the spirometric sensor for a brief period of time (step 22). The subject may be asked to undertake a range of activities to ensure the enrollment data are representative of that which may be encountered over the subject's normal day-to-day activities. The processor analyzes the enrollment data and generates subject characterization data for identifying the known subject (step 23). This subject characterization data is stored for later use during the identity authentication mode of the present system (step 24), as will be described below.

Figure 2:
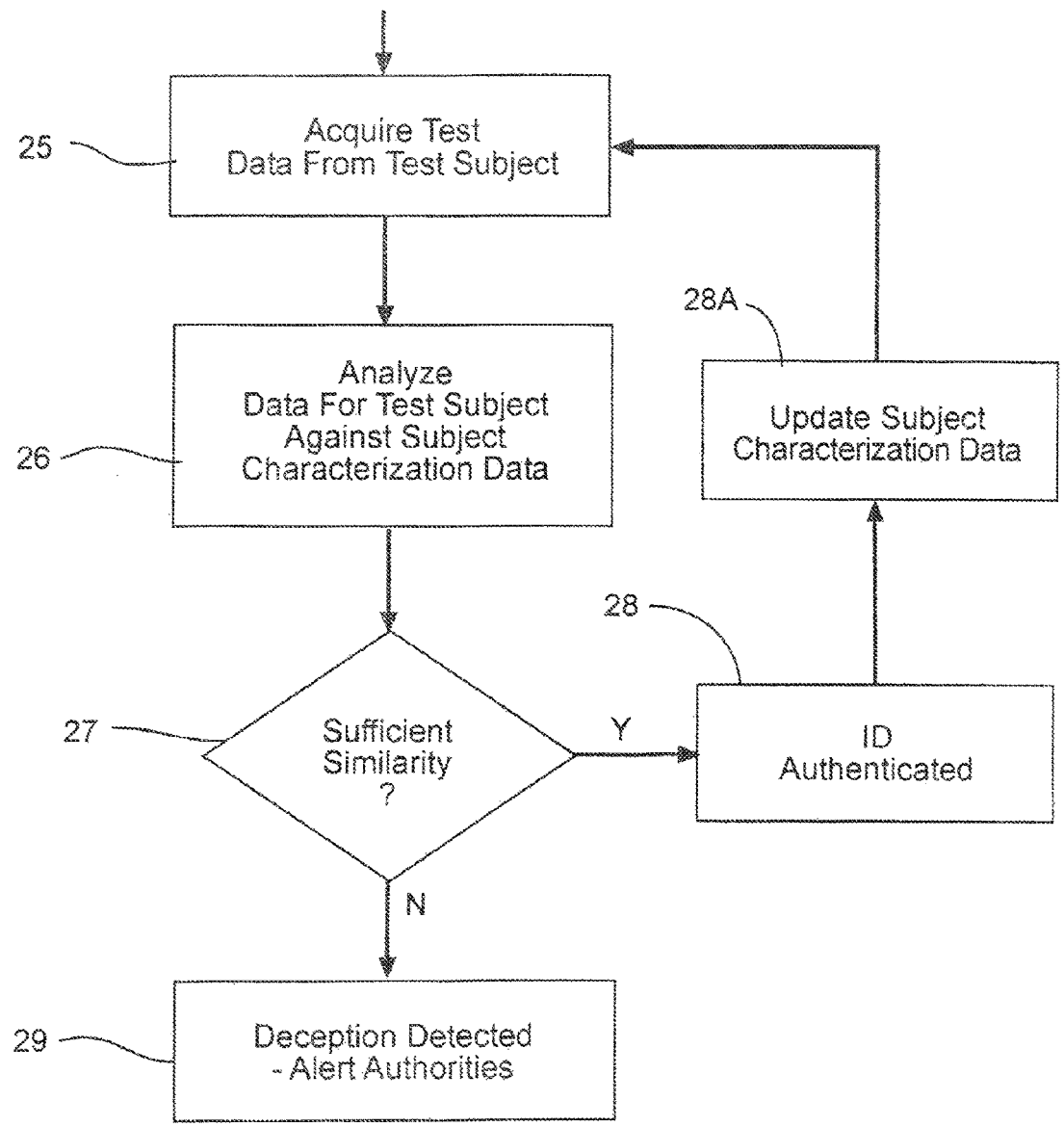
FIG. 2 is a flowchart of the identity authentication mode of the present invention.

The identity authentication mode is used to authenticate the identity of a test subject, who may or may not be the known subject from the enrollment mode. In this mode, the system acquires subject data unsupervised in the field, compares it to subject and impostor characteristics, and decides whether to authenticate or challenge identification. FIG. 2 is a flowchart of one possible embodiment of the identity authentication mode. For each identity authentication test, the processor acquires pulse wave data from the pulse sensor and spirometric data from the spirometric sensor for the test subject (step 25). The processor analyzes this test data using the subject characterization data (step 26). Based on this analysis, in step 27, the processor determines whether there is a sufficient degree of similarity between the pulse wave and spirometric characteristics of the known subject (from the subject characterization data) and the test subject to conclude that these subjects are the same person (step 28). If so, the processor may update the subject characterization data 18 to include the current test data (step 28A) and then loop back to step 25. Otherwise, if the processor determines that the current test subject is not the same as the known subject, an alarm can be activated to signal that deception has been detected (step 29).

As will be discussed below, the two modes in the preferred embodiment of the present invention share a common "acquire trial" procedure that acquires and pre-processes a short, contiguous time-series data of the digitized measurement, called a "trial".

Figure 3:
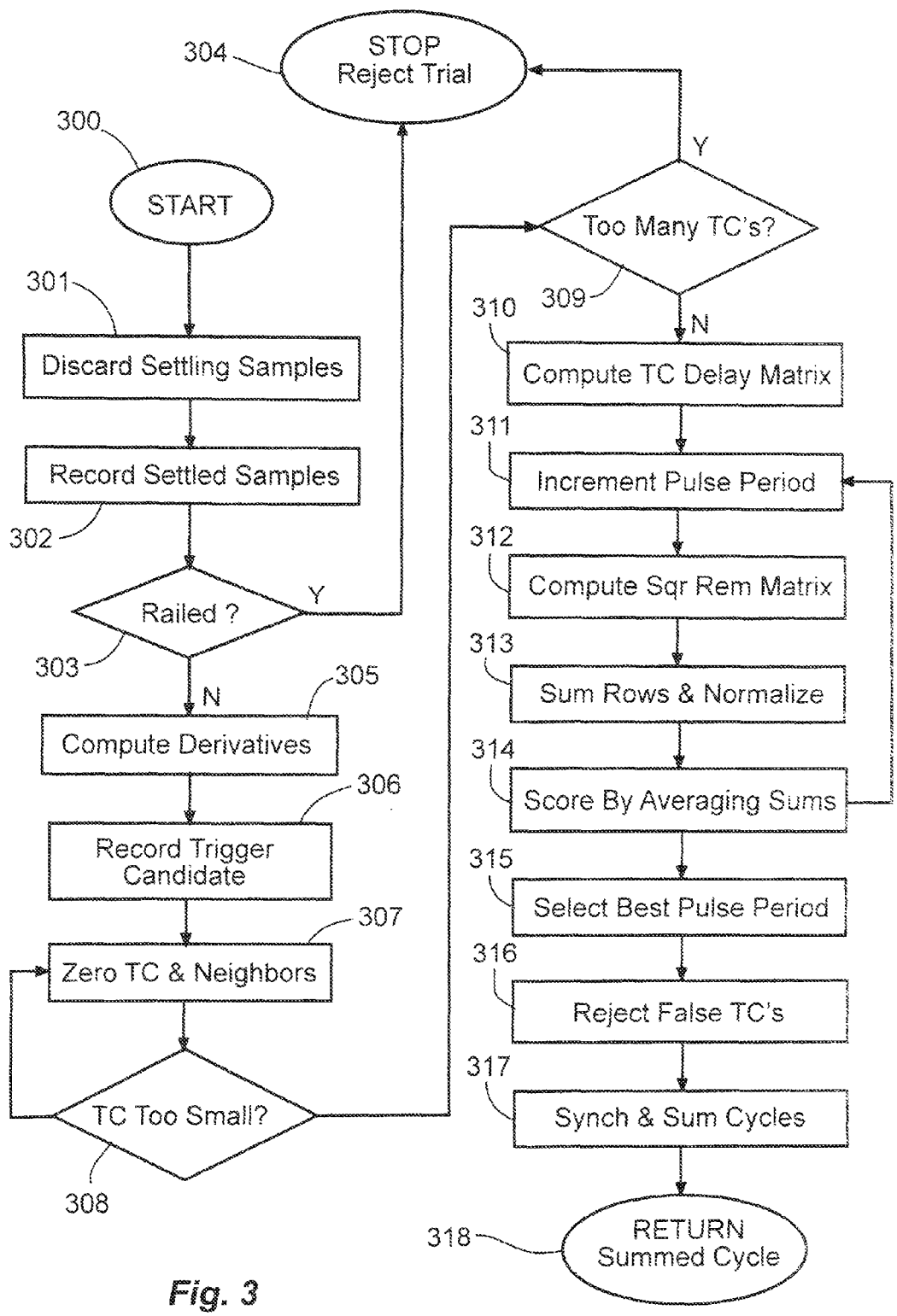
FIG. 3 is a flowchart of the "acquire trial" procedure for pulse wave data.

FIG. 3 shows how the pulse wave algorithm acquires a trial. The trial pulse wave typically consists of a small number (e.g. 10) of pulse cycles, which are similar but not identical to each other. Performance is improved by synchronizing and summing pulse cycles to wash out noise. The goal of the procedure is to convert the multi-cycle waveform into a single representative cycle. Block 300 is the start of the procedure. Block 301 reads and discards pulse samples for a fixed duration (e.g. 2 seconds) while the waveform settles. After settling, block 302 reads and records samples for the remainder of the trial (e.g. 8 seconds). The concurrently running block 303 tests samples for "railing" (i.e. exceeding the limits of the digitizer, an indicator of trial corruption). Upon detecting a railed sample, Block 303 calls block 304, which rejects the trial and stops the procedure. If no recorded samples are railed, control proceeds to block 305, which calculates the first and second derivatives of the pulse wave with respect to time, to eliminate baseline drift and generate triggers associated with the systolic excursion. Representing the subject's pulse wave with its first derivative also obscures the bio-informational nature of the signal, thus enhancing privacy. The derivatives may or may not be smoothed to reduce high frequency noise. Block 306 chooses the most negative excursion of the second derivative as the "trigger candidate" (TC). Next, block 307 zeroes the TC and some small number (e.g. 4) of immediate predecessor and successor data, to avoid selecting the same peak again. Then, block 308 compares the present TC to the first TC. If the present TC is greater than some threshold fraction (e.g. ½) of the first TC, the procedure loops through blocks 306-308, acquiring another TC. If not, TC acquisition is deemed complete, and control proceeds to block 309. If there are many (e.g., 8) more TCs than can be accounted for according to the settled sampling time and maximum pulse rate (e.g., 16 for 8 seconds at 120 beats per minute), the sample is judged too noisy, and block 309 calls block 304, which rejects the trial and stops the procedure. If not, the trial is accepted, but some of the TCs may be noise spikes asynchronous to the underlying pulse cycle.

The section comprising blocks 310-316 is called the "trigger sieve" because it removes asynchronous false triggers, thus enhancing performance (recent data showed useable trial yield increasing from ⅕ to ⅘). Block 310 calculates a square matrix of the delays Δ between every pair of TCs. Next, the procedure loops through all integer pulse periods, in units of the sampling period, from the fastest to the slowest measurable pulse (e.g., 50-150 for 100 Hz sampling and 120-40 beats per minute), to find the best fit to the preponderance of TCs. Block 311 increments the pulse period P. Block 312 computes the matrix of squared remainders $[\Delta \bmod P]^2$, where the "mod" operation yields the integer remainder with the smallest absolute value (e.g., 15 mod 8 equals −1, not 7). Block 313 sums the squared remainders for each TC relative to the other TCs, and normalizes such that a "score" near (much smaller than) unity indicates P is a poor (good) fit to the true pulse period. Block 314 averages the TC scores to evaluate P's goodness of fit. Block 315 selects the P with the lowest score. Next, block 316 rejects TCs with optimal-P scores greater than a preset threshold (e.g., 0.6) as false triggers not synchronized with the prevailing pulsatile rhythm, leaving the remaining TCs to serve as true triggers. Then, block 317 uses the true triggers to synchronize and sum the cycles. Finally, block 318 returns the summed cycle to the calling program.

Figure 4:
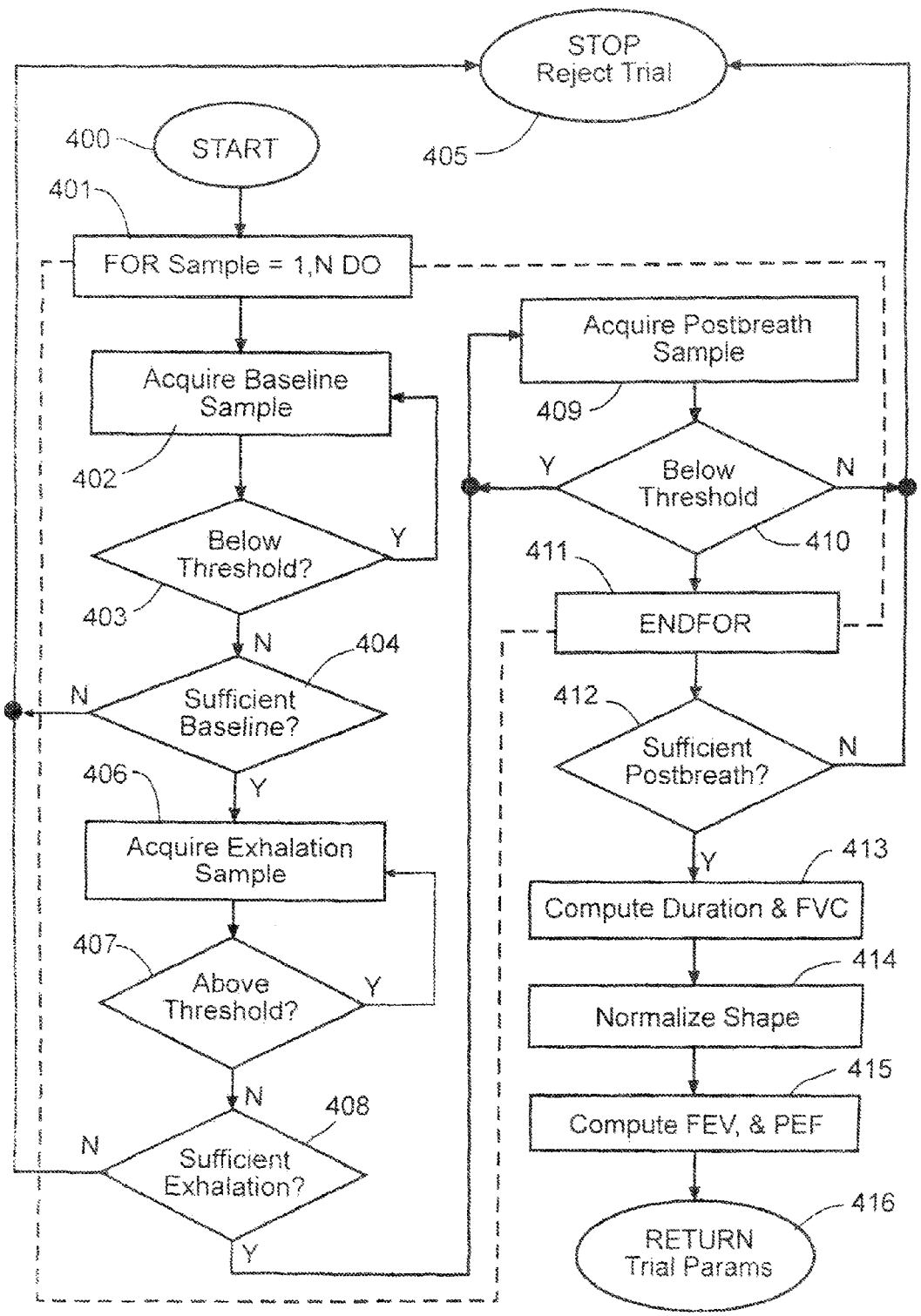
FIG. 4 is a flowchart of the "acquire trial" procedure for spirometric data.

FIG. 4 shows how the breath print algorithm acquires a trial. The trial consists of a single forced exhalation, preceded by a quiescent period used to establish a signal baseline, and succeeded by a period used to ensure further exhalation is not forthcoming to spoil the data. The goals of the procedure are to delineate these three periods, subtract the baseline from the exhalation, measure the exhalation duration and forced vital capacity (FVC), normalize the exhalation shape to duration, and compute the auxiliary parameters forced expiratory volume in the initial second ($FEV_1$) and peak expiratory flow (PEF). Block 400 is the start of the procedure. Block 401 initiates a data acquisition and processing loop that repeats for a fixed number of trial samples (e.g. 1500 for a 15 second trial digitized at 100 Hz). Blocks 402 and 403 repeatedly acquire samples until the flow signal exceeds a threshold defining the onset of exhalation. Block 404 determines if there are sufficient samples to establish a baseline (e.g. 50): If not, control passes to block 405, which rejects the trial and stops the procedure. If so, the average of the baseline samples is recorded and control passes to block 406. Blocks 406 and 407 repeatedly acquire samples until the flow signal falls below the previously defined threshold, at which time exhalation is deemed to have ceased. Block 408 determines if there are sufficient exhalation samples (e.g. 250): If not, control passes to block 405, which rejects the trial and stops the procedure. If so, the net (baseline-subtracted) exhalation samples are recorded and control passes to block 409. Blocks 409 and 410 acquire post-breath samples until the trial times out, or a sample exceeds the previously defined threshold, indicating a resurgence of exhalation. In the latter case, the trial is deemed corrupted, and control passes to block 405, which rejects the trial and stops the procedure. In the former case, block 411 passes control to block 412, which determines if there are sufficient post-breath samples (e.g. 1). If not, control passes to block 405, which rejects the trial and stops the procedure. If so, control passes to block 413, which computes the exhalation duration and FVC. Block 414 uses these to normalize the exhalation shape in time and amplitude, for comparison to other exhalations of different durations and FVCs. Block 415 computes the $FEV_1$ and PEF. Block 416 returns duration, FVC, shape, $FEV_1$ and PEF to the calling routine, and ends the procedure.

Figure 5:
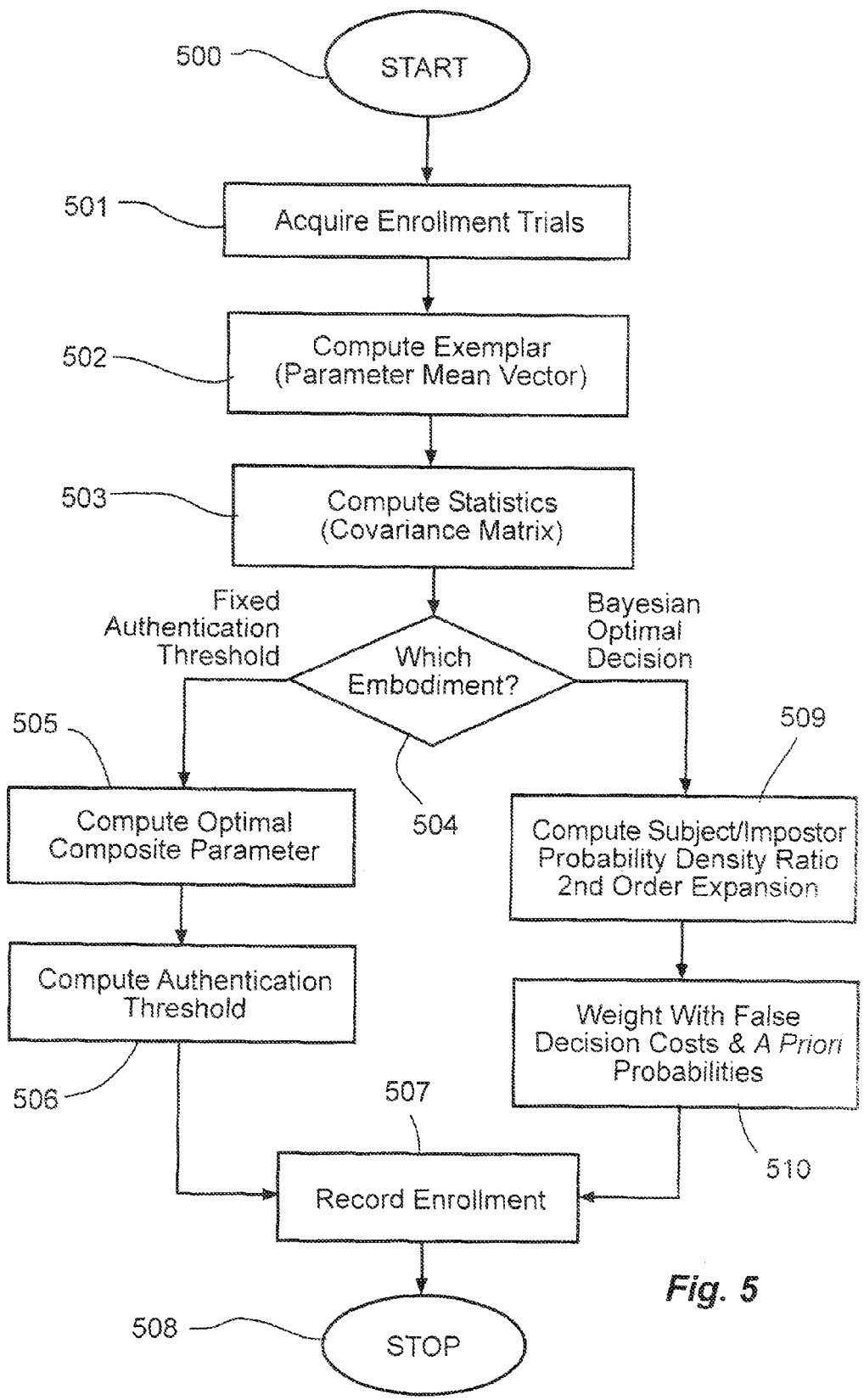
FIG. 5 is a flowchart of the procedure used by both the pulse wave and breath print algorithms to enroll a new client.

FIG. 5 shows two embodiments of the procedure used by both the pulse wave and breath print algorithms to enroll a new client. This procedure can be used both to establish the client's characteristics as a subject whose identity will be putative in the field, and as a possible impostor for any other client. Block 500 is the start of the procedure. Block 501 acquires a number of trials (e.g., five) by repeatedly calling the appropriate Acquire Trial procedure. Block 502 computes the "exemplar" (i.e., the arithmetic mean over the enrollment trials of any or all of the pulse wave shape vector, the breath print duration and FVC scalars, the breath print shape vector, and the breath print $FEV_1$ and PEF scalars, arranged into a vector) using the enrollment trials. Block 503 computes the statistics (i.e., the covariance matrix) of the enrollment trial, as well as the relative weights of the shape vector components. The latter may incorporate either or both of two independent innovations: (1) dynamic weighting, in which portions of the shape vector that are more repeatable from trial to trial are accentuated relative to less repeatable portions; and (2) feature weighting, in which portions of the shape vector that are more specific or distinctive to the subject are accentuated relative to portions more typical of the population at large.

Block 504 transfers control to one of two blocks, depending on whether the "fixed authentication threshold" or the "Bayesian optimal decision" embodiment of the algorithm is selected. The chief distinction is that the Bayesian embodiment makes use of potential impostor data (i.e., from other clients as potentials impostors for the subject), while the fixed threshold does not. Block 505 finds the principle components of the covariance matrix, and uses the dominant eigenvector (i.e., that with the largest eigenvalue) to linearly combine the parameter vector into a scalar "composite parameter", which is optimal in the sense that the enrollment data has the greatest correlation, and thus the least spread, along the dominant eigenvector. In general, this results in unequal weighting of the parameters in the decision to authenticate or challenge identity. Next, block 506 computes the authentication threshold corresponding to the preset desired true authentication probability (e.g., ⅞). Then, block 507 enrolls the client, and block 508 stops the procedure. On the other bifurcation, block 509 expands the ratio of the subject probability density to the impostor probability density to second order in the deviation from the subject exemplar. Block 510 includes the effects of the generally unequal penalties of false authentication and false challenge, and the a priori probability of attempted deception, which varies among clients. Since the Bayesian optimal decision embodiment uses the entire covariance matrix, it is not necessary or advantageous to define a composite parameter; and since impostor data is incorporated, the true and false authentication probabilities can be traded.

Figure 6:
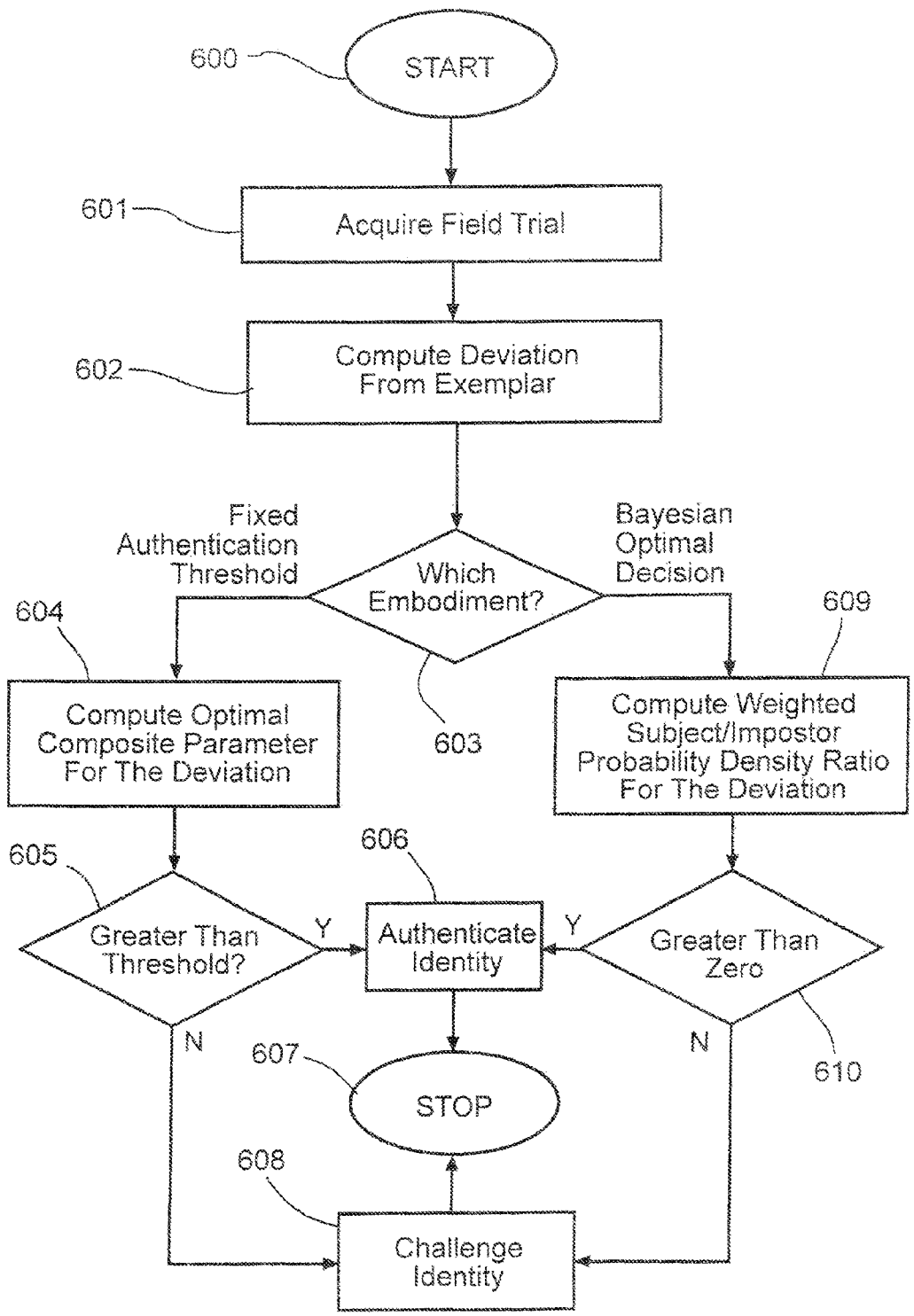
FIG. 6 is a flowchart of the identity authentication mode of the present invention.

FIG. 6 shows how either algorithm embodiment decides whether to authenticate or challenge the subject's identity based on a field trial. Block 600 is the start of the procedure. Block 601 acquires a field trial, and block 602 subtracts the subject exemplar to yield the "deviation", a vector with the same structure as a trial, and optionally applies dynamic or feature weighting to the deviations of the shape vectors. Block 603 transfers control to one of two blocks, depending on whether the "fixed authentication threshold" or the "Bayesian optimal decision" embodiment of the algorithm is selected. Block 604 computes the optimal composite parameter for the deviation, and block 605 compares it to the authentication threshold. If greater, block 606 advises authorities to authenticate the subject's identity, and block 607 stops the procedure. If lesser, block 608 advises authorities to challenge the subject's identity. On the other bifurcation, block 609 computes the ratio of the subject probability density to the impostor probability density to second order in the deviation of the field trial from the subject exemplar, and block 610 compares it to zero. If positive, block 606 advises authorities to authenticate the subject's identity. If negative, block 608 advises authorities to challenge the subject's identity.

As so far described, the algorithm uniformly weights each exemplar shape vector component, placing equal importance on the various features. However, this restriction is unnecessary, and may not be optimal. Some parts of some subjects' exemplars are more characteristic than other parts, so it's reasonable to suppose weighting unusual features more heavily could enhance the distinguishability of subjects.

Figure 7:
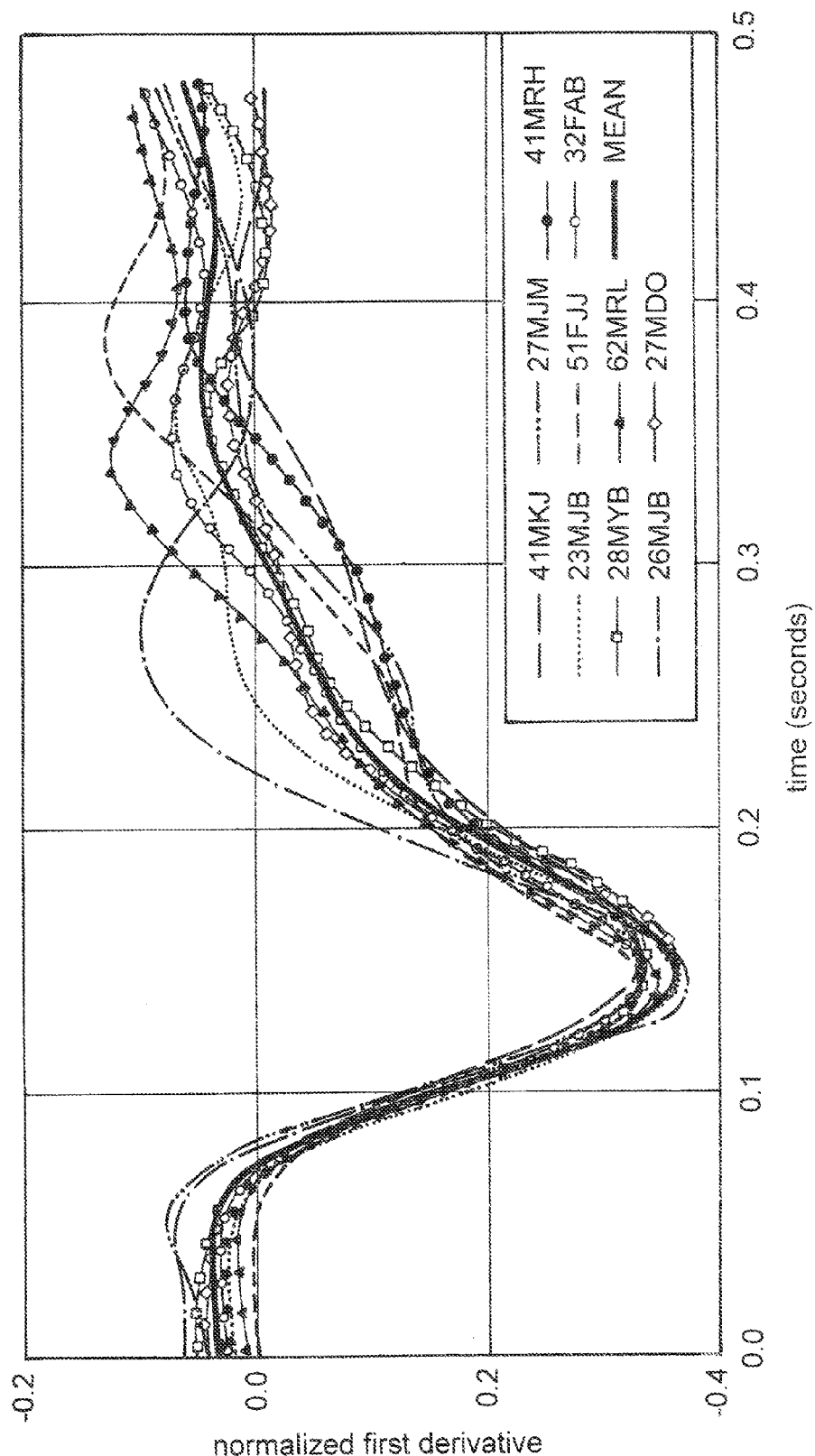
FIG. 7 is a graph showing pulse wave exemplar shape vectors of the ten subjects of a recent study, along with the mean pulse wave shape.

FIG. 7 shows the pulse wave exemplar shape vectors of the ten subjects of a recent study, along with the mean pulse wave shape. Generally, some subjects are more atypical than others, and therefore are more easily identified in the field. Some subjects have features (e.g., subject 26MJB near 0.27 seconds) that are quite distinctive. If these features are weighted more heavily than more typical regions (e.g., subject 26MJB near 0.14 seconds), the subject is more readily recognized when supplying a legitimate field trial, and less easily mimicked by an impostor. An example feature-weighting strategy is to weight each field trial shape vector component proportionally to the square of the deviation of the corresponding subject exemplar component from the mean exemplar component, thus placing greater weight on more unusual features.

The present invention can use several biometric scalars and vectors to authenticate or challenge identity. These are assumed to be random variables obeying Gaussian statistics. For scalar quantities (e.g., breath duration and volume), the procedure is straightforward: Collect some number J (e.g., five) of trustworthy samples $E_{j=1,J}$ from the subject during the controlled enrollment period, calculate the mean $\mu = [\Sigma_{j=1,J} E_j]/J$ and the variance $\sigma^2 = [\Sigma_{j=1,J}(E_j-\mu)^2]/(J-1)$, and express the probability density of a field trial F as $P = \exp[-(F-\mu)^2/(2\sigma^2)]/[\sqrt{(2\pi)}\sigma]$.

For K-dimensional shape vectors, the simplest generalization is $P = \exp[-\Sigma_{k=1,K}(F_k-\mu_k)^2/(2\sigma^2)]/[\sqrt{(2\pi)}\sigma]$, where $\mu_k$ is the $k^{th}$ component of the exemplar vector $\mu$, and the global variance is $\sigma^2 = [\Sigma_{j=1,J}\Sigma_{k=1,K}(E_{j,k}-\mu_k)^2]/(JK-1)$. The exemplar vector may be the average enrollment vector $\mu \equiv [\Sigma_{j=1,J} E_j]/J$, or the renormalized unitary vector $[\Sigma_{j=1,J} E_j]/[\Sigma_{j=1,J} E_j^2]^{1/2}$. There are two independent problems with this approach:

First, the expectation value of the exponential's argument scales with the vector dimensionality K. For large vectors, P rapidly vanishes as E deviates from μ. In other words, each component of the vector has the same weight in the authentication decision as each scalar, so the shape vector has K times the weight of any scalar. A possible solution is to redefine the global variance as $\sigma^2 \equiv K[\Sigma_{j=1,J} \Sigma_{k=1,K} (E_{j,k} - \mu k)^2]/JK-1)$, which reduces to the scalar form when $K \to 1$.

Second, all components are equally weighted, so that noisier portions of the shape vector dominate. The failure of static weighting suggests quieter portions of the vector should be accentuated (i.e., dynamic weighting). Extreme dynamic weighting is to define a local variance $\sigma_k^2 \equiv [\Sigma_{j=1,J}(E_{j,k}-\mu k)^2]/(J-1)$ for each component of each subject's shape vector. The drawback is the practical limitation to an enrollment comprising only a few trials, causing inordinate statistical fluctuations.

Both problems can be solved by partitioning the vector into N K/N-dimensional segments that are large enough to tame statistical fluctuations, yet small enough to provide resolution of the varying character across the vector. The segments need not be equal lengths, or even contiguous, but there's no clear advantage to these complications, so for simplicity we specify uniform contiguous segments. Each segment has its own variance $\sigma_n^2 \equiv [\Sigma_{j=1,J} \Sigma_{k=(n-1)K/N+1,nK/N}(E_{j,k}-\mu k)^2]/(JK/N-1)$, but each component retains its own mean. Otherwise, it must be admitted that the original K-resolution was unnecessary. We then define dynamic weights $W_n$ based on the variances (e.g., $W_n=1/\sigma_n^2$), and also possibly the rarity of shape features (i.e., feature weighting).

To correct the over-representation of shape relative to scalar quantities, we define a normalized variance $\sigma^2 \equiv [\Sigma_{j=1,J} \Delta_j^2]/(J-1)$, where $\Delta_j^2 \equiv \Sigma_{k=1,K} W_{[(k-1)/N]}(E_{j,k}-\mu k)^2$. As a check, allow N=K (i.e., local variance) and $W_n=1/\sigma_n^2$ (i.e., uniform variance), and the normalized variance $\sigma^2 \to K$ as it should.

The probability density of a field trial F must be modified to $P = \exp\{-[\Sigma_{k=1,K} W_{[(k-1)/N]}(F_k-\mu k)^2]/(2\sigma^2)\}/[\sqrt{(2\pi)}\sigma]$. Pretending for the moment that an enrollment trial $E_j$ is actually a field trial F, this reduces to $P = \exp\{-\Delta_j^2/(2\sigma^2)\}/[\sqrt{(2\pi)}\sigma]$, whose exponential argument is of order 1 rather than order K, as desired. The field trial must be mathematically processed exactly as were the enrollment trials. Then, regardless of the specific choice of dynamic weights $W_n$, all will come out right in the end.

One technique for implementing dynamic weighting is to parse the shape vector into segments that are large enough to avoid excessive statistical fluctuations, yet small enough to provide resolution of the varying character across the vector (e.g., a 100-component breath print vector into 20 five-component segments), and assign a different weight to each segment based on its fluctuations. An example dynamic-weighting strategy is to weight each field trial shape vector segment proportionally to the reciprocal of the segment's variance (i.e., the sum over enrollment trials and segment components of the squared deviation of the enrollment trial component from the exemplar component), thus placing greater weight on more repeatable segments.

One technique for implementing feature weighting is to raise each shape vector component probability to a different power greater or less than unity, according to how much the exemplar shape deviates from the average subject at that point. The feature weighting function can be expressed as a vector of the same dimensionality as the shape itself, consisting of components whose average is unity (equal weighting is encompassed as the special case where all components are 1). This approach keeps the rest of the algorithm unaffected by whether feature weighting is selected or disabled. In general, the feature weighting vector is different for each client.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for biometric identity confirmation of a subject having a pulse and a respiratory cycle, said method comprising:
during an initial training mode, simultaneously acquiring pulse wave shape data and spirometric data from a known subject;
generating and storing subject characterization data for the known subject derived at least in part from both the pulse wave shape data and spirometric data for the known subject by:
(a) computing an exemplar from the pulse wave shape data and spirometric data for the known subject during the initial training mode; and
(b) selectively weighting portions of the exemplar; and
during a subsequent identity authentication mode, simultaneously acquiring pulse wave shape data and spirometric data from a test subject, and analyzing the pulse wave shape data and spirometric data with the subject characterization data for the known subject to confirm whether the identity of the test subject matches the known subject.

2. The method of claim 1 wherein portions of the exemplar are selectively weighted based on their repeatability among known subjects.

3. The method of claim 1 wherein portions of the exemplar are selectively weighted based on distinguishing characteristic features among known subjects.

4. The method of claim 1 wherein the exemplar is computed at least in part from the pulse wave shape data by synchronous averaging of multiple pulse cycles.

5. The method of claim 1 wherein the subject characterization data is derived at least in part from a first derivative of the pulse wave shape data with respect to time.

6. The method of claim 1 wherein the step of generating subject characterization data further comprises use of a second derivative of the pulse wave shape data with respect to time to identify pulse cycle start points for synchronous averaging of multiple pulse cycles to create an exemplar for the known subject.

7. The method of claim 6 wherein the second derivative of the pulse wave shape data is used to identity trigger candidates for the pulse cycle start point; and further comprising an analysis of a time delay between trigger candidates to thereby discard false trigger candidates and identify true trigger candidates for synchronous averaging of multiple pulse cycles.

8. The method of claim 1 wherein the step of generating subject characterization data further comprises:
computing an exemplar in the form of a parameter vector from the pulse wave shape data and spirometric data for the known subject;

computing a covariance matrix from the pulse wave shape data and spirometric data for the known subject;

computing an optimal composite parameter from the covariance matrix and parameter vector that is characteristic of the known subject; and computing an authentication threshold corresponding to a desired true authentication probability for the known subject.

9. The method of claim 8 wherein the step of analyzing the pulse wave shape data and spirometric data with the subject characterization data for the known subject to confirm whether the identity of the test subject matches the known subject further comprises:

computing a deviation of the pulse wave shape data and spirometric data for the test subject from the exemplar for the known subject;

computing an optimal composite parameter from the deviation; and confirming the identity of the test subject matches the known subject if optimal composite parameter is greater than the authentication threshold for the known subject.

10. The method of claim 1 wherein the step of generating subject characterization data further comprises:

computing an exemplar in the form of a parameter vector from the pulse wave shape data and spirometric data for the known subject;

computing a covariance matrix from the pulse wave shape data and spirometric data for the known subject; and computing a probability distribution ratio of a weighted subject/impostor probability density by a Bayesian optimal decision analysis of the parameter vector, covariance matrix, and data from other subjects as potential impostors for the known subject.

11. The method of claim 10 wherein the step of analyzing the pulse wave shape data and spirometric data with the subject characterization data for the known subject to confirm whether the identity of the test subject matches the known subject further comprises:

computing a deviation of the pulse wave shape data and spirometric data for the test subject from the exemplar for the known subject;

computing a weighted subject/impostor probability density ratio for the deviation; and confirming the identity of the test subject matches the known subject if the weighted subject/impostor probability density ratio is greater than zero.

12. A method of claim 1 wherein the step of generating subject characterization data for the known subject further comprises measurement of characteristic changes in the pulse wave shape data as a function of the phase of the respiratory cycle of the known subject.

* * * * *